United States Patent [19]

Oinoue

[11] Patent Number: 4,572,476
[45] Date of Patent: Feb. 25, 1986

[54] METHOD FOR DETECTING A FOCUS CONDITION OF AN IMAGING OPTICAL SYSTEM EMPLOYING INTERPOLATED SIGNAL VALUES

[75] Inventor: Kenichi Oinoue, Tokyo, Japan

[73] Assignee: Olympus Optical Company Limited, Tokyo, Japan

[21] Appl. No.: 496,404

[22] Filed: May 20, 1983

[30] Foreign Application Priority Data

May 25, 1982 [JP] Japan ............................. 57-88335

[51] Int. Cl.$^4$ ............................................... G01J 1/20
[52] U.S. Cl. ....................................... 250/201; 354/406
[58] Field of Search ............... 250/201, 204, 208, 209; 354/406, 407, 408

[56] References Cited

U.S. PATENT DOCUMENTS

| | | | |
|---|---|---|---|
| 4,037,958 | 7/1977 | Schmidt et al. | 250/201 |
| 4,203,031 | 5/1980 | Kamachi et al. | 250/204 |
| 4,297,571 | 10/1981 | Utagawa et al. | 250/201 |
| 4,373,791 | 2/1983 | Araki | 354/407 |

Primary Examiner—David C. Nelms
Attorney, Agent, or Firm—Parkhurst & Oliff

[57] ABSTRACT

A method for detecting a focus condition of an objective lens system of a single-lens reflex camera is disclosed. A light flux emanating from the objective lens system is divided into first and second light fluxes by means of a prism array having inclined surfaces whose normal lines make a critical angle with respect to the optical axis of the imaging optical system. Said first and second light fluxes are transmitted through first and second halves of the objective lens system. The first and second light fluxes are made incident upon first and second light receiving element arrays, respectively, to produce first and second sets of output signals representing light distribution of first and second images formed by the first and second light fluxes. From the first and second sets of output signals, interpolated values are derived to form first and second modified sets of signals composed of the first and second sets of output signals and interpolated values. A correlation between the first and second modified sets of signals is derived to detect the focus condition of the objective lens.

9 Claims, 9 Drawing Figures

METHOD FOR DETECTING A FOCUS CONDITION OF AN IMAGING OPTICAL SYSTEM EMPLOYING INTERPOLATED SIGNAL VALUES

BACKGROUND OF THE INVENTION

The present invention relates to a method for detecting a focus condition of an imaging optical system comprising dividing a light flux emanating from the imaging optical system into a first light flux which is transmitted through a first region of the imaging optical system and a second light flux which is transmitted through a second region of the imaging optical system, said second region including a portion different from the first region, projecting separately the first and second light fluxes into first and second light receiving element arrays to produce first and second sets of photoelectrically converted output signals, and deriving a correlation between the first and second sets of output signals to detect a focus condition of the imaging optical system due to a lateral shift of first and second images formed on said first and second light receiving element arrays by said first and second light fluxes.

Such a focus detection method has been utilized in various optical machineries such as still camera, television camera and cine camera.

It has been proposed in, for instance, Japanese Patent Application Laid-open Publications Nos. 60,645/73 and 95,221/77 to detect the focus conditions, i.e. forwardly and backwardly de-focused and in-focused conditions of an objective lens by dividing a light flux emanating from the objective lens into two light fluxes transmitted through right and left halves of the objective lens, respectively, by means of a light flux dividing means and by comparing a phase shift of images formed by said divided light fluxes upon a pair of light receiving element arrays. In the former method disclosed in the above mentioned Laid-open Publication No. 60,654/73, the light flux dividing optical system is formed by an oscillating slit which is mechanically moved. In the latter method, a relay lens is arranged behind a predetermined focal plane of the objective lens and thus a relatively large space is required. In both methods, it is difficult to derive with a high sensitivity a correlation of distributions of the photoelectrically converted output signals from the light receiving element arrays which receive selectively the light fluxes transmitted through the right and left halves of the objective lens, respectively. In Japanese Patent Application Laid-open Publication No. 159,259/79 there is disclosed a focus condition detecting method in which an array of micro lenses is used as the light flux dividing optical system and each light receiving element of the arrays is arranged to receive light fluxes emanating from respective micro lenses. The light amount distributions of the light fluxes transmitted through the right and left halves of the objective lens are compared with each other in a physical manner for each light receiving element pair and when the coincidence is detected, the objective lens is considered to be in-focus.

In the last mentioned method disclosed in Japanese Patent Application Laid-open Publication No. 159,259/79, in order to make the two physical amounts coincident with each other, it is necessary to provide the micro lens system, and in the in-focus condition the image must be formed on the micro lens system. However, it is quite difficult to manufacture the micro lens array with a high precision. Moreover, in order to avoid the superimposition of the light fluxes upon each other, it is necessary to pitch the micro lens array to a large extent or to provide small light receiving elements. Thus, if an image has a sharp edge, the edge might situate at an intermediate position between successive light receiving element pairs. In such a situation, the correlation of the images cannot be derived precisely.

SUMMARY OF THE INVENTION

The present invention has for its object to provide a novel and useful method for detecting a focus condition of an imaging optical system which can obviate the drawbacks of the known methods and can derive a correlation between light amount distributions with a high precision.

According to the invention, in a method for detecting a focus condition of an imaging optical system comprising dividing a light flux emanating from the imaging optical system into a first light flux which is transmitted through a first region of the imaging optical system and a second light flux which is transmitted through a second region of the imaging optical system, said second region including a portion different from the first region, projecting separately the first and second light fluxes onto first and second light receiving element arrays to produce first and second sets of photoelectrically converted output signals, and deriving a correlation between the first and second sets of output signals to detect a focus condition of the imaging optical system due to a lateral shift of first and second images formed on said first and second light receiving element arrays by said first and second light fluxes, the improvement comprising modifying at least one of said first and second sets of output signals by deriving interpolated values at intermediate positions between successive light receiving elements of at least one of the first and second light receiving element arrays.

DESCRIPTION OF THE PREFERRED EMBODIMENTS

Figure 1:
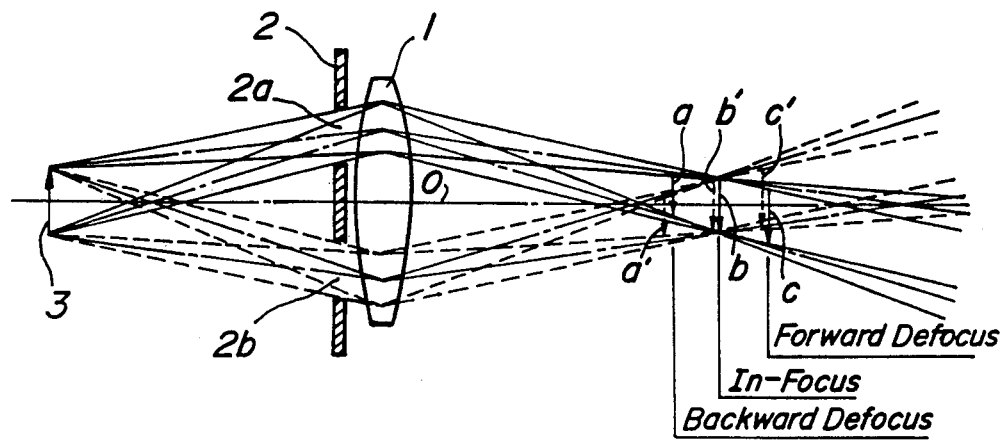
FIG. 1 is a schematic view showing a principle of a known focus detection method involving a lateral shift of two images.

As is well known in the art, images formed by light fluxes emanating from right and left halves of an objective lens are shifted from each other in a lateral direction in accordance with a degree of defocus. FIG. 1 is a schematic view explaining the principle of such a lateral shift. In front of an objective lens 1 is arranged a stop 2 having apertures 2a and 2b situated symmetrically with respect to an optical axis O. Light fluxes emanating from an object 3 to be photographed are made incident upon the objective lens 1 through the stop 2. The fluxes transmitted through upper and lower regions of the objective lens 1 make images a, b, c and a', b', c', respectively. In an in-focused condition, these images b and b' become coincident with each other, but in a backwardly defocused condition, the images a and a' are shifted laterally in one direction and in a forwardly defocused condition, the images c and c' are shifted laterally in the other direction. Therefore, by dividing the light fluxes transmitted through the upper and lower regions of the objective lens from each other and by detecting the direction and amount of the lateral shift of the images formed by the divided light fluxes, it is possible to detect the focus condition of the objective lens.

Figure 2:
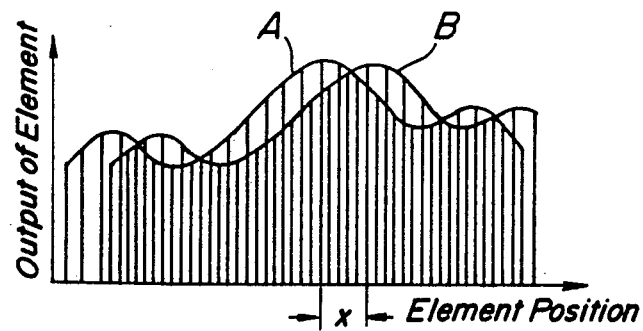
FIG. 2 is a graph illustrating distribution curves of output signals from two light receiving element arrays.

FIG. 2 shows distributions of photoelectrically converted output signals A and B supplied from a pair of light receiving element arrays upon which are made incident the two images formed by the two light fluxes emanating from the upper and lower regions of the objective lens. As shown in FIG. 2, the distribution curve A is shifted leftward by a phase difference x with respect to the distribution curve B and this phase difference x represents the lateral shift of the two images due to the defocus.

Figure 3:
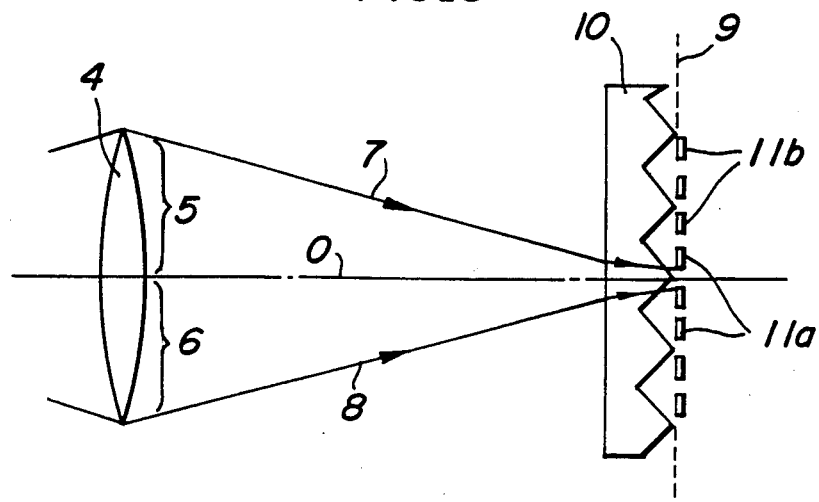
FIG. 3 is a schematic view showing an embodiment of a light flux dividing system of a device for carrying out the focus detection method according to the invention.

FIG. 3 is a schematic view showing an embodiment of an optical system for effecting the focus detection method according to the invention. In the present embodiment, light fluxes 7 and 8 transmitted through first and second regions 5 and 6 of an imaging optical system 4 such as an objective lens of a camera are divided from each other by means of an array of prisms 10 having inclined surfaces set at a critical angles with respect to the optical axis O. The prism array 10 is placed near a predetermined focal plane 9 which is optically conjugated with a film plane. The light fluxes 7 and 8 are made selectively incident upon first and second light receiving element arrays 11a and 11b, respectively. The light receiving element arrays 11a and 11b may be formed by a single array of light receiving elements and in this case odd numbered elements belong to the first array 11a and even numbered elements belong to the second array 11b. Then the odd and even numbered element arrays produce two sets of photoelectrically converted output signals each representing light amount distributions corresponding to the two images formed on respective light receiving element arrays 11a and 11b. It should be noted that in FIG. 3 the first and second regions are formed by upper and lower halves of the objective lens 4, but they may be formed by completely separated portions or may have a common portion.

The method for detecting the focus condition of the lens by detecting the lateral shift of the two images formed by the two light fluxes divided by the prism array has been described in detail in a U.S. patent application Ser. No. 426,898 filed on Sept. 29, 1982, now U.S. Pat. No. 4,443,079. Now, this method will be explained briefly with reference to FIG. 4.

Figure 4:
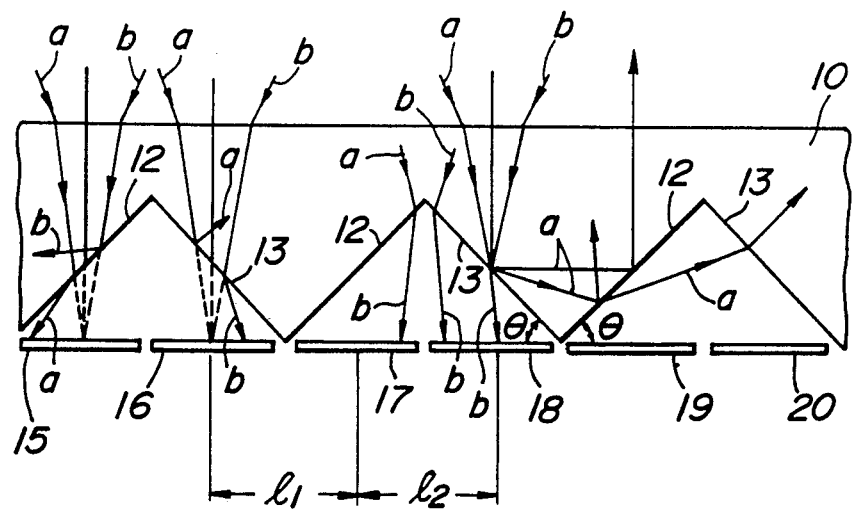
FIG. 4 is an enlarged view of the light flux dividing system shown in FIG. 3.
Figure 5:
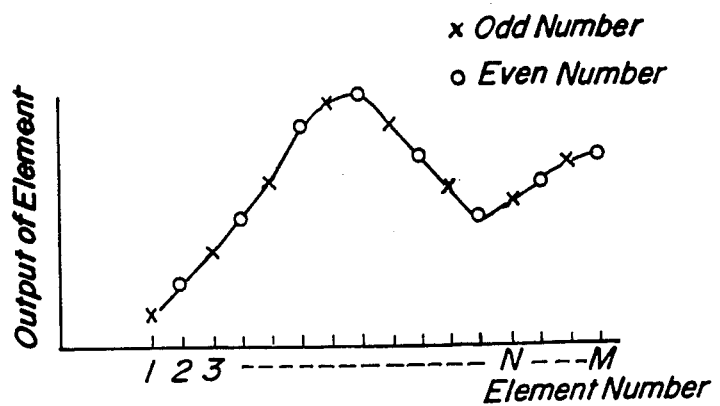
FIG. 5 is a graph depicting distribution curves of output signals from light receiving element arrays.

In FIG. 4, light fluxes a and b transmitted through a first region, for instance upper half and a second region, i.e. lower half of the objective lens 4 are made incident upon the prism array 10 having pairs of inclined surfaces 12 and 13 whose normal lines make a critical angle with respect to the optical axis in opposite directions. Thus, the light fluxes a and b are separated from each other and are made incident upon odd and even numbered light receiving elements 15, 17, 19 - - - and 16, 18, 20 - - - , respectively. When the prism array 10 is made of glass having a refractive index of 1.5 and its entrance and exit surfaces are in contact with the air, the lines normal to the inclined surfaces 12 and 13 make the critical angle of 42° with respect to the optical axis. In this manner, the images formed by the light fluxes transmitted through the first and second regions of the objective lens 4 can be separately received by the first and second light receiving element arrays, respectively. FIG. 5 shows output signals from these light receiving elements. A mark x represents the output signals supplied from the odd numbered elements and a mark o denotes the output signals from the even numbered elements.

In the known methods, the output signal distribution of the odd numbered elements and the output signal distribution of the even numbered elements are compared with each other to detect the focus condition of the objective lens. However, the light fluxes impinging upon each pair of elements 15, 16; 17, 18; 19, 20; - - - are not emanating from the same point of an object to be photographed, but from different points of the object. Therefore, even in the in-focused condition, the two light amount distributions do not become identical with each other. Therefore, unless the inclined surfaces 12 and 13 of the prism array 10 and the light receiving elements are made infinitesimally small, the focus condition could not be detected precisely. In practice, the light receiving element has a finite area such as several tens $\mu m^2$ and if this area is made extremely small, a signal to noise ratio becomes impermissibly small. Further, since a resolution of an ordinary photographic lens is substantially equal to or smaller than the dimension of the light receiving element, and the prism array having an infinitesimally small dimension could not be manufactured, the correlation between the distributions of the output signal from the odd and even numbered light receiving elements becomes lower as compared with that in which the completely identical images are relatively shifted. Therefore, in the known methods, although it is possible to detect correctly the focus condition when the images are defocused to a substantial extent, the focus condition could not be detected precisely, particularly near the in-focused condition.

According to the invention, in order to increase the accuracy of the focus detection especially near the in-focused condition, an interpolation method is introduced to modify at least one of the first and second sets of the output signals supplied from the odd and even numbered light receiving elements. For instance, interpolation values are derived as weighted means of the output signals of adjacent light receiving elements. According to the invention, the distributions of the output signals supplied from the odd and even numbered elements may be modified by the interpolation or one of the distributions may be modified by interpolation. In the present embodiment, both the first and second distributions are modified by effecting the interpolation and then the distributions thus modified are compared with each other to detect the focus condition.

Figure 6A:
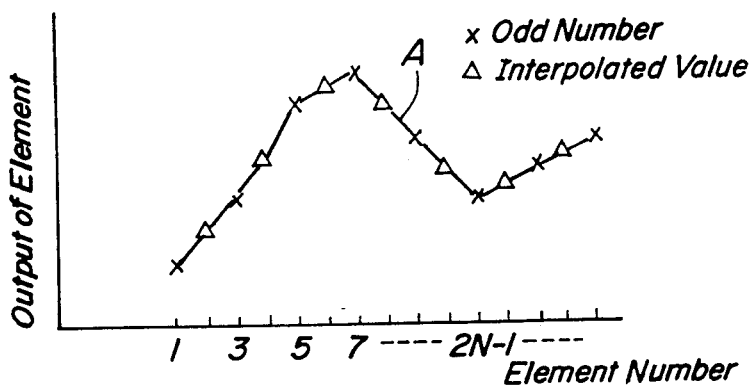
FIGS. 6A and 6B are graphs showing interpolated distribution curves according to the invention.
Figure 6B:
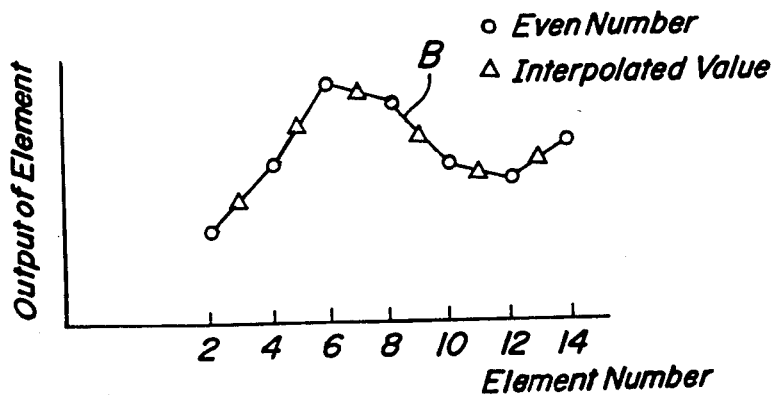

FIG. 6A shows a modified distribution curve A composed of the output signals (x) of the odd numbered elements and interpolated values (Δ) derived from the output signals of the odd numbered elements. FIG. 6B illustrates a modified distribution curve B composed of the output signals (o) of the even numbered elements and interpolated values (Δ) derived from the output signals of the even numbered elements. It is apparent that there is a very strong correlation between the modified distribution curves A and B.

Now, a method of effecting a linear interpolation will be explained. It is first assumed that the distribution of the output signals from the even numbered elements will be derived by the interpolation. As shown in FIG. 4, 2n-th element is separated from (2n+1)-th element by a distance $l_1$ and the (2n+1)-th element is separated from (2n+2)-th element by a distance $l_2$. Then an interpolated value $A'_{2n+1}$ may be expressed as follows:

$$\frac{A'_{2n+1} - A_{2n}}{l_1} = \frac{A_{2n+2} - A_{2n}}{l_1 + l_2}$$

wherein $A_{2n}$ and $A_{2n+2}$ are output values from the 2n-th and (2n+2)-th elements, respectively. From the above equation, the following equation can be obtained:

$$A'_{2n+1} = \frac{l_1}{l_1 + l_2}(A_{2n+2} - A_{2n}) + A_{2n}$$

In the same manner, successive interpolated values can be derived as follows:

$$A'_3 = \frac{l_1}{l_1 + l_2}(A_4 - A_2) + A_2$$

$$A'_5 = \frac{l_1}{l_1 + l_2}(A_6 - A_4) + A_4$$

$$A'_{2n-1} = \frac{l_1}{l_1 + l_2}(A_{2n} - A_{2n-2}) + A_{2n-2}$$

$$A'_{2n+1} = \frac{l_1}{l_1 + l_2}(A_{2n+2} - A_{2n}) + A_{2n}$$

$$A'_{2n+3} = \frac{l_1}{l_1 + l_2}(A_{2n+4} - A_{2n+2}) + A_{2n+2}$$

Now, the modified distributions of the output signals from the even numbered elements can be expressed as follows: $A_2, A'_3, A_4, A'_5, A_6, A'_7 - - - A'_{2n-1}, A_{2n}, A'_{2n+1} - - -$. In a similar manner, for the output signals supplied from the odd numbered elements, the interpolation is effected to obtain the modified distribution of the output signal from the odd numbered elements as follows, $B'_2, B_3, B'_4, B_5, B'_6 - - - B_{2n-1}, B'_{2n}, B_{2n+1} - - -$. It should be noted that the values $B'_2, B'_4 - - - B'_{2n} - -$ are values derived by the interpolation. When the distances $l_1$ and $l_2$ are equal to each other, the interpolated values are mean values of the successively adjacent even numbered elements ($A'_{2n+1} = \frac{1}{2}(A_{2n+2} + A_{2n})$). Now, an evaluation function F is derived from these modified distributions as follows by rewriting $$\begin{pmatrix} A_2, A'_3, A_4 - - - \\ B'_2, B_3, B'_4 - - - \end{pmatrix} \text{ into } \begin{pmatrix} A_2, A_3, A_4 - - - \\ B_2, B_3, B_4 - - - \end{pmatrix}$$

-continued
$$F = \sum_{n=2} \{|A_n - B_{n+1}| - |A_{n+1} - B_n|\}$$

Figure 7:
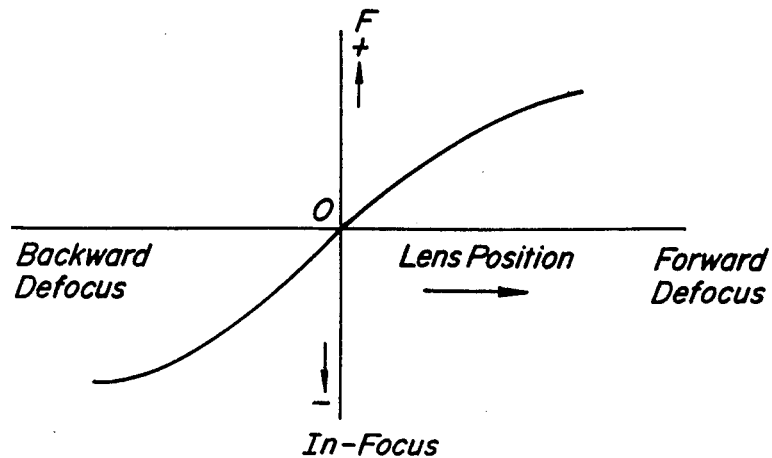
FIG. 7 is a graph illustrating an evaluation function.

FIG. 7 shows a curve of the thus calculated evaluation function F for various lens positions. When the objective lens is in the in-focus condition, the evaluation function F becomes just zero. When the lens is in the forwardly or backwardly defocused condition, the evaluation function F becomes positive or negative. In this manner, the focus condition of the objective lens can be detected precisely, particularly near the in-focused condition.

In a modified embodiment of the focus detection method according to the invention, only the interpolated values $A'_3, A'_5 - - - A'_{2n-1}, A'_{2n+1} - - -$ for the output signals from the even numbered light receiving elements are calculated and then the interpolated values are compared with the output signals from the odd numbered elements in accordance with the following evaluation function F':

$$F = \sum_{n=2} \{|A'_{2n-1} - B_{2n+1}| - |A'_{2n+1} - B_{2n-1}|\}$$

Figure 8:
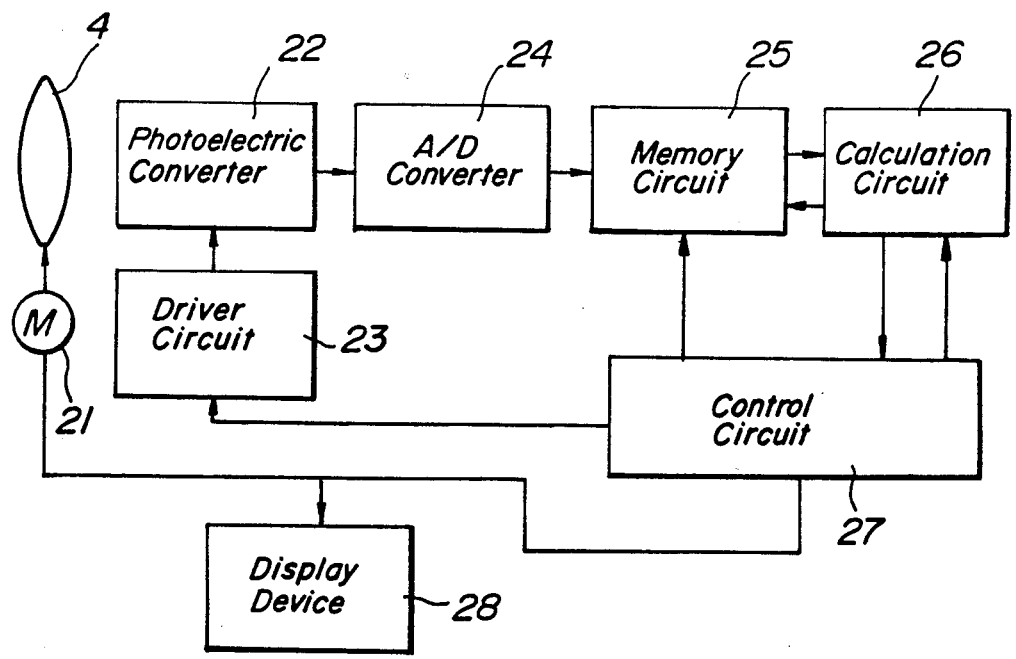
FIG. 8 is a block diagram showing one embodiment of an automatic focusing device utilizing the method according to the invention.

FIG. 8 is a block diagram illustrating an embodiment of an automatic focus adjusting mechanism in which the focus condition of an objective lens is detected by the method according to the invention. The objective lens 4 is movable in an optical axis direction by means of a motor 21. A light flux transmitted through the lens 4 is received by a photoelectric converting unit 22 comprising the prism array 10 and the light receiving element arrays 11a and 11b shown in FIG. 3. The light receiving element arrays may be formed by a solid state imaging device such as a CCD (charge coupled device) and a MOS photodiode array.

The light receiving element arrays in the photoelectric converting unit 22 are driven by a driver circuit 23 and in each element a photoelectrically converted electric signal is integrated for a suitable time. Then, electric signals stored in odd numbered elements and those stored in even numbered elements are successively read out and coverted into digital signals by an A/D converter 24. The digital signals thus obtained are then stored in a memory circuit 25 and then are supplied to a calculation circuit 26 in which the interpolation is effected at first and then the evaluation function is calculated. The evaluation function thus calculated is supplied to a control circuit 27 which produces a control signal to the motor 21 and a display device 28 for indicating the detected focus condition. The motor 21 is so driven that the objective lens 4 is automatically moved into the in-focused position. The driver circuit 23, A/D converter 24, memory circuit 25 and calculation circuit 26 are controlled by the control circuit 27 in accordance with a given program.

As explained above in detail, according to the invention, the lateral shift of the two images formed on the two light receiving element arrays by the light fluxes transmitted through the first and second regions of the imaging optical system can be detected precisely by using the interpolated values of the output signals from the elements. That is to say, according to the invention, since the two distribution curves of the light amount have a large correlation, the lateral shift of the two images can be detected accurately over a wide dynamic range. Due to the above facts, the method according to the invention can be carried out by means of the light flux dividing device having a simple construction. Further, even if the light receiving elements are not arranged equidistantly, the distribution of the output signals can be interpolated by taking into account the intervals between successive elements, and therefore the focus detection accuracy can be improved by the detection apparatus of simple construction.

Further, the amount of the lateral shift due to the de-focus of the imaging lens system is determined by an angle between principal light rays of the divided light fluxes. Therefore, when the focus detection device shown in FIG. 3 is used in a single-lens reflex camera having an objective lens which is movable over a relatively long distance along the optical axis, the amount of the lateral shift can be adjusted at will by changing the inclination angle of the inclined surfaces of the prism array. Therefore, according to the invention, it is possible to prevent such a drawback that the focus detection becomes impossible due to the fact that the two images are formed beyond the light receiving element array. Moreover, it is also possible to adjust the detection accuracy and detection range to some extent.

It should be noted that the present invention is not limited to the embodiments so far explained, but many modifications and alterations can be conceived within the scope of the invention. For instance, the method according to the invention is used only for determining the direction in which the imaging lens system is to be driven in the defocused condition, and the in-focused condition can be detected by utilizing another focus detection method due to an image sharpness detection. In such a case, a pitch of the light receiving elements may be larger. Further, the light flux dividing device may be formed by any other optical means than the prism array. However, the micro prism array is preferable, because the micro prism array can provide the focus detection device with a simple and small construction and high detection accuracy. Further, the micro prism array can be manufactured easily. In the embodiment shown in FIG. 4, the inclined surfaces are so arranged that their normal lines make the critical angle with respect to the optical axis. In such a case, there might be produced an error due to the influence of an image height. That is to say, at portions of the light receiving elements away from the optical axis, principal light rays are not parallel with the optical axis, but are inclined thereto, and therefore the first and second light fluxes are not correctly made incident upon the first and second light receiving element arrays. In order to avoid such a drawback, the prism array may have inclined surfaces whose normal lines make different angles with respect to the optical axis, said different angles being gradually increased in accordance with an increase in distance from the optical axis. That is to say, the outermost prism element may have inclined surfaces whose normal lines make an angle larger than the critical angle with respect to the optical axis. By such measures, the influence of the image height can be compensated for and the accuracy of the focus detection can be made much higher.

What is claimed is:

1. In a method for detecting a focus condition of an imaging optical system comprising dividing a light flux emanating from the imaging optical system into a first light flux which is transmitted through a first region of the imaging optical system and a second light flux which is transmitted through a second region of the imaging optical system, said second region including a portion different from the first region, projecting separately the first and second light fluxes onto first and second light receiving element arrays to produce first and second sets of photoelectrically converted output signals, and deriving a correlation between the first and second sets of output signals to detect a focus condition of the imaging optical system due to a lateral shift of first and second images formed on said first and second light receiving element arrays by said first and second light fluxes, the improvement comprising modifying at least one of said first and second sets of output signals by deriving therefrom interpolated values which approximate output signals at intermediate positions between successive light receiving elements of at least one of the first and second light receiving element arrays.

2. A method according to claim 1, whrein said light flux emanating from the imaging optical system is divided by means of a prism array arranged in front of the light receiving element arrays, said prism array having inclined surfaces such that lines normal to such inclined surfaces make substantially critical angles with respect to any light ray among incident light fluxes.

3. A method according to claim 2, wherein said light flux emanating from the imaging optical system is divided by the prism array having inclined surfaces whose normal lines make angles with respect to the optical axis of the imaging optical system, said angles being increased gradually in accordance with an increase in distance from the optical axis.

4. A method according to claim 2, wherein the light fluxes divided by the inclined surfaces of the prism array are received by respective pairs of the light receiving elements of the first and second arrays.

5. A method according to claim 1, wherein said first and second sets of output signals supplied from the first and second light receiving element arrays are modified by the interpolation to form a modified first set of signals composed of the original first set of output signals and interpolated values and a modified second set of signals composed of the original second set of output signals and interpolated values, and a correlation between said first and second modified sets of signals is derived to detect the focus condition.

6. A method according to claim 1, wherein one of said first and second sets of output signals is modified by the interpolation to form a modified set of signals composed of interpolated values, and a correlation between the modified set of signals and the other of the first and second sets of output signals is derived to detect the focus condition.

7. A method according to claim 1, wherein said interpolated values are calculated by a weighted means of output signals supplied from adjacent light receiving elements of the same array.

8. A method according to claim 7, wherein said interpolated values are is calculated by an equation.

$$A'_{2n+1} = \frac{l_1}{l_1 + l_2}(A_{2n+2} + A_{2n})$$

where $l_1$ is the distance between adjacent light receiving elements of the first and second arrays, $l_2$ is the distance between adjacent light receiving elements of the second and first arrays, and $A_{2n}$ and $A_{2n+2}$ are output signals supplied from the adjacent light receiving elements of the same array.

9. A method according to claim 2, wherein said light ray among the incident light fluxes is a light ray on the optical axis of the imaging optical system.

* * * * *